July 20, 1954     D. S. GREY     2,684,015
REFLECTING MIRROR OPTICAL OBJECTIVE

Filed April 27, 1950

| COMPONENT | RADIUS | DISTANCE |
|---|---|---|
| MIRROR I | $R_1 = 7.60$ | $d_1 = 14.56$ |
| MIRROR II | $R_2 = 29.00$ | $d_2 = 21.00$ <br> $d_3 = 19.00$ |

David S. Grey
INVENTOR

BY Donald C. Brown
and Moncure B. Berg
Attorneys

July 20, 1954     D. S. GREY     2,684,015
REFLECTING MIRROR OPTICAL OBJECTIVE
Filed April 27, 1950     4 Sheets-Sheet 3

| COMPONENT | RADIUS | DISTANCE | MATERIAL |
|---|---|---|---|
| LENS VI | $R_7 = \infty$<br>$R_8 = 5.0$ | $d_8 = 0.145$<br>$t_2 = 4.8$ | Thallium bromo-iodide |
| MIRROR VII | $R_9 = 7.60$ | $d_9 = 11.90$ | |
| MIRROR VIII | $R_{10} = 29.00$ | $d_{10} = 21.00$<br>$d_{11} = 19.00$ | |

David S. Grey
INVENTOR.

BY Donald L. Brown
and
Moncure B. Berg
Attorneys

Patented July 20, 1954

2,684,015

UNITED STATES PATENT OFFICE 2,684,015

REFLECTING MIRROR OPTICAL OBJECTIVE

David S. Grey, Weston, Mass., assignor to Polaroid Corporation, Cambridge, Mass., a corporation of Delaware Application April 27, 1950, Serial No. 158,377

7 Claims. (Cl. 88—57)

This invention relates to optical systems and more particularly has reference to objectives usable in conjunction with microscopes and other image-forming devices employed with infrared radiation.

An object of this invention is to provide an improved system for use in microscope objectives and the like and particularly to provide a system of this character which is of simple design employing but two mirror elements at a numerical aperture up to the order of 0.65 and which, when combined with one refracting lens element, may provide numerical apertures up to the order of 1.5.

Other objects of this invention reside in the provision of a novel objective for use within the infrared region of the electromagnetic spectrum and to provide an objective of this nature which comprises a plurality of optically aligned mirror elements and may, in addition, comprise a refractive lens element whereby to form an objective which is corrected for spherical aberration and coma and has a numerical aperture of the order of 0.80 or larger.

A further object of the invention is to provide an objective of the character described which comprises a pair of mirror elements and which may be readily converted into an objective having a higher numerical aperture without change in the mirror construction or design merely by the addition of one refractive component to the system.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein:

Figure 1 of the drawings is a sectional view of an objective lens system which comprises two optically aligned mirror elements;

Figure 1:
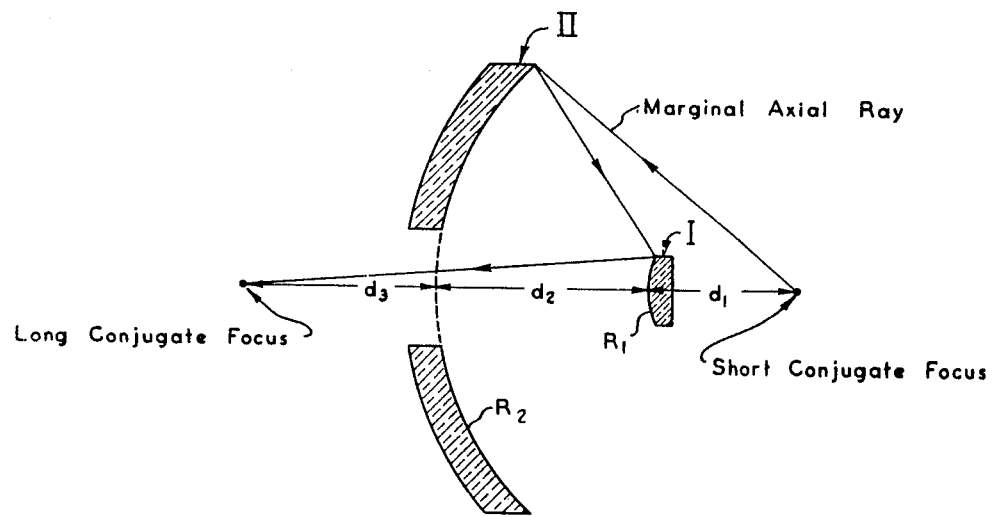

In Fig. 1 there is shown an objective system which embodies the concepts of this invention and which comprises two optically aligned mirror elements I and II. Mirror element II is provided with an opening extending centrally therethrough and has a continuous concave reflecting surface in surrounding relation to said opening. The mirror I has a continuous convex reflecting surface and is so positioned that its reflecting surface faces the reflecting surface of the element II. Elements I and II, as shown, each have only one optical surface, namely, their respective reflecting surfaces.

The reflecting surfaces of the mirrors I and II are preferably provided by an aluminum or gold coating. Other materials may, however, be employed for reflection coatings such as silver and the like.

Mirror elements I and II are adapted to be carried in a suitable mount (not shown) and in an arrangement whereby the concave reflecting surface of element II faces the short conjugate focus of the objective to the end that light, received on the reflecting surface of one of the mirror elements from an object point, is reflected onto the reflecting surface of the other mirror element and is redirected to a conjugate focus of the objective.

In the drawings, the full line with the arrows thereon illustrates the path direction of light traversing the objective when employed as a microscope objective and traces a marginal axial ray through the objective. For the purposes of microscopy, the objective is adapted to be located so that the object being observed is substantially at the short conjugate focus of the objective.

The objective shown in Fig. 1 may be said to constitute a pure reflecting system in that it is made up solely of mirror elements. Consider a pure reflecting system of this character for light travelling from the long conjugate focus of the system to the short conjugate focus.

A defect of a pure reflecting system is the obscuration of aperture, which has a certain minimum value dependent on the tolerance for spherical aberration and coma.

Under the convention just set forth, namely, the passage of light travelling from the long conjugate focus to the short conjugate focus of the objective, let an object as seen at the convex mirror be real and move the object progressively closer to the convex mirror. During this process, change the curvature of the convex mirror so that the image distance after reflection at the convex mirror is constant. It will now be found that as the image distance decreases, the absolute value of the third order spherical aberration from the convex mirror increases and this is so until a very small image distance is reached. This change in aberration of the convex mirror increases that spacing between the concave and convex mirrors which provides zero net third order spherical aberration and coma, and gives a consequent reduction in obscuring ratio.

The relation between obscuring ratio and magnification may be easily represented in equation form for the case that third order coma and third order spherical aberration are zero. Although this exact condition may not be desired in practice, an analysis of the case is indicative of the effect of magnification on obscuration.

If third order spherical aberration and coma are both eliminated, the mirror surfaces have a common center of curvature. Let $d$ denote the distance from the common center to the object point, and $R_1$ and $R_2$ the radii of curvature of the convex and concave mirrors, respectively.

Then the condition for removal of third order spherical aberration is:

$$\frac{R_1}{R_2} = 3/2 - \frac{R_1}{d} - \left(\frac{5}{4} - \frac{R_1}{d}\right)^{\frac{1}{2}} \quad (1)$$

Third order coma is eliminated by the concentricity of the mirrors.

The percent of aperture obscured is given by $Q^{-2}$ where $$Q = \frac{3dR_2 - R_1R_2 - 2R_1d}{R_2(d - R_1)} \quad (2)$$

The magnification M (from long conjugate focus to short conjugate focus) is given by $$M = \left(1 - \frac{d}{R_1} + 2\left(\frac{d}{R_1} - 1\right)^{\frac{1}{2}}\right)^{-1} \quad (3)$$

From these equations, Q may be expressed in terms of M.

$$Q = [2M + (5M^2 - 6M + 5)^{\frac{1}{2}}][1 - M]^{-1} \quad (4)$$

From Equations 3 and 4 it may be seen that as $d$ becomes nearly equal to $2R_1$, the magnification approaches unity and the obscuring ratio approaches zero.

Figure 4:
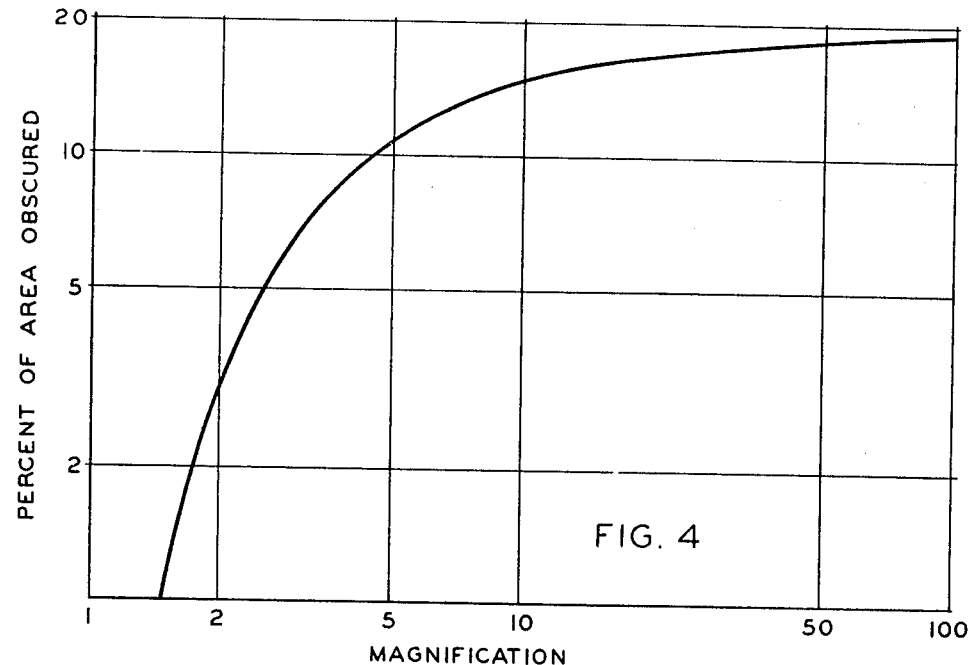
Fig. 4 is a graph showing magnification plotted against obscuration for objectives of the character with which the invention is concerned.

Now set $m = 1/M$. Then $m$ will represent the magnification of the objective used in the conventional sense, that is, with the object at the short conjugate focus. Then we may plot obscured area as a function of $m$ as in Fig. 4. From the appearance of this graph, one may expect that the following general conclusion is valid, namely, that if a purely reflecting objective may be used at low initial magnification, the obscuration will be greatly reduced.

In considering a solution of parameters, such as focal length and numerical aperture for an infrared objective, the decision is in many respects more complicated than the corresponding problem in visual optics.

Large numerical aperture and low obscuring ratio are desirable in infrared transmitting systems, not only to improve resolving power as limited by diffraction theory, but also to receive from a small specimen area a larger quantity of infrared radiation. In many cases, the smallness of a particle which can be observed under infrared radiation is limited not only by diffraction theory but also by the absolute amount of infrared radiation which is presented to an infrared detecting device used in conjunction with a microscope.

Thus an increase in energy collected from the specimen by reduction of the obscuring ratio is usually as fully important as a similar gain through increasing numerical aperture. Since, as pointed out in the foregoing, the obscuring ratio decreases as the magnification of the microscope decreases, it is well, but not necessary, to use an initial magnification for the microscope objective as low as other considerations permit.

The degree to which aberrations should be reduced in a visual or ultraviolet transmitting objective is rather clear cut. The aberrations, in the case of the visual or ultraviolet objective, should introduce phase differences over the aperture not exceeding a value approximately equal to one-quarter wavelength of the visual or ultraviolet light employed. An infrared microscope objective, which may satisfy the just mentioned quarter-wave condition for infrared radiation of a wavelength of five microns, for example, may well be unable to satisfy the quarter-wave condition for light in the visible region of the spectrum. Inferior image quality may be expected when using an objective primarily designed for infrared radiation with visible radiation. The design of an infrared transmitting objective must, therefore, take this into consideration since the specimen will initially be observed under visible light to assist in properly locating it in the microscope field. Therefore, it may be noted that although numerical apertures larger than 0.65 may be corrected for spherical aberration in infrared, it is well to assure that the visual image is also well corrected.

In addition, to achieve small obscuring ratio, it is desirable to use a rather long focal length for the objective. If the focal length is long, the mechanical supports protruding into the aperture of the objective to support the convex mirror will obscure but a small percentage of the aperture.

In considering the factors enumerated above, it may be concluded that a numerical aperture of about 0.65 and focal length of 5.0 millimeters offers a satisfactory solution to the difficulties involved. It should be pointed out, however, that larger numerical apertures are possible with only two mirrors if the aberrations are permitted to more nearly approach a quarter wave at a wavelength of five microns or if the obscuration is made larger.

The objective illustrated in Fig. 1 for carrying out the concepts of the invention specifically comprises a convex element I provided with a convex reflecting surface having a radius of curvature $R_1$ and a concave mirror element II provided with a concave reflecting surface having a radius of curvature $R_2$ with the radii $R_1$ and $R_2$ equaling, respectively, 1.38 and 0.362 times the spacing $d_2$ between said mirror elements. In this regard, the spacing $d_2$ between mirrors I and II may be any convenient linear distance and is determined by the mechanical features and construction of the microscope with which the objective is to be employed. Variation in the spacing $d_2$ will thus result in variation in the physical size, i. e., overall length and width dimensions, of the objective.

The embodiment of the invention illustrated in the drawings makes use of curvatures and spacings for the mirror elements I and II of the order just specifically noted. The constructional data with dimensions in millimeters for the specific example of the lens system illustrated is given in the table which immediately follows:

TABLE 1

| Component | Radius | Distance |
|---|---|---|
| Mirror I | $R_1 = 7.60$ | $d_1 = 14.56$ |
| Mirror II | $R_2 = 29.00$ | $d_2 = 21.00$ |
| | | $d_3 = 19.00$ |

Comprehended as a variation of the specific design disclosed, which falls within the spirit and the scope of the invention, is the reduction or enlargement by equal percentages of the radii and spacing of the design set forth. As a specific example, radii $R_1$ and $R_2$ and spacing $d_2$ may be scaled down to one-half the values shown in the foregoing table. The result of such practice is merely to reduce the physical size of the objective and the long and short conjugate focal lengths thereof by one-half, while maintaining the characteristics of the objective set forth, including its numeral aperture, substantially unaltered. Similarly, physical enlargement of the objective may be carried out by multiplying the values given in the foregoing table for radii $R_1$ and $R_2$ and the spacing $d_2$ by a common factor which is greater than one.

A particular advantage of the present invention is that it is aplanatic within the infrared region while permitting this condition to be attained without resort to aspheric surfaces.

The objective disclosed in Fig. 1 is designed to have a numerical aperture of about 0.63 although smaller numerical apertures may obviously be used. This objective has a focal length of 5.0 millimeters, a magnification of about 7.9, an obscuration of about 12% in area and is not corrected for cover slide.

From the foregoing, the desirability will be apparent of providing an objective of increased numerical aperture with low obscuration for use in the infrared region of the spectrum. As intimated, an important object of the invention is to accomplish these desiderata without change in the mirror construction or design of the system of Fig. 1 and merely by the addition of one refractive component to the system whereby to convert the system into an objective having a higher numerical aperture than the objective of Fig. 1 while possessing the same obscuring ratio. The refractive component adapted for this purpose may be so designed as to provide a dry objective or an immersion type objective.

Figure 2:
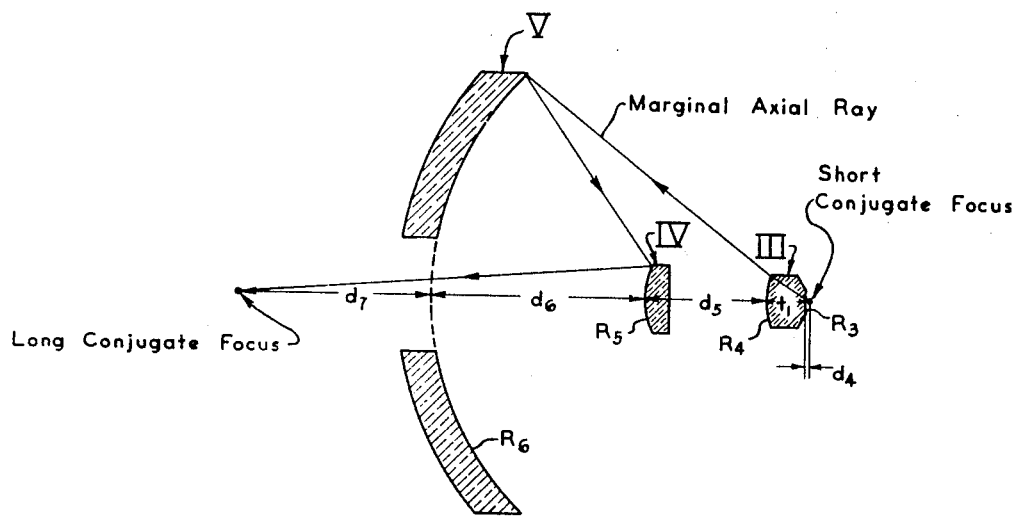
Fig. 2 is a view similar to Fig. 1 of another embodiment of the invention.

A system of this character for use as a dry objective is shown in Fig. 2 as comprising mirror elements IV and V alike in all respects to the mirror elements of Fig. 1 and spaced apart by a distance $d_6$ equal to the distance $d_2$ of Fig. 1. In addition to the mirror elements IV and V, Fig. 2 discloses a refractive lens element III of an infrared transmitting material positioned in optical alignment with the mirror elements on the side thereof which includes the short conjugate focus of the mirror elements when considered alone.

Lens element III is designed to accept light from the object over a numerical aperture which is greater than the numerical aperture of the mirror combination. Specifically, the numerical aperture accepted by lens III may be equal to 0.89. In addition, lens element III is designed to magnify the object undergoing observation 1.4 times. A virtual image of the object is adapted to be formed by the lens III and this virtual image is presented as an object to the mirrors V and IV. The light cone of numerical aperture 0.89, originally accepted by the lens III from the object, is reduced in numerical aperture at the virtual object presented to the mirrors by a factor of 1.4 which is the same factor as that by which the object is magnified by the lens III. This reduction at the virtual object in the light cone originally accepted by the lens III gives the value 0.89/1.4 as the numerical aperture at the virtual image. This fraction is equal to 0.63, which is the value of the numerical aperture accepted by the mirror elements V and IV.

Therefore, it becomes apparent that the mirrors can accept a cone of numerical aperture 0.89 from the real object as distinguished from the virtual object. It follows that these benefits of increased numerical aperture may be obtained by spacing the lens III from the mirror combination so that the virtual image formed by this lens falls at a position which coincides with the short conjugate focus of the mirrors IV and V taken alone. Furthermore, if the lens III is suitably shaped, the virtual image formed thereby is substantially free of spherical aberration and coma and consequently a corrected system of the enlarged numerical aperture just mentioned is obtained.

With special reference to the lens element III of Fig. 2, it may be noted that this element is a meniscus element having concave surface of radius $R_3$ adjacent the short conjugate focus of the objective as a whole and a convex refracting surface of radius $R_4$ located on the side of said lens closest to the convex mirror IV.

A family of lenses similar in design to lens III may be made by dividing or multiplying the thickness $t_1$ and curvatures $R_3$ and $R_4$ of said lens III by any positive number. In the lens III which forms the specific subject of illustration, $R_4$ is approximately equal to 2.03 times the thickness of the lens and $R_3$ is approximately equal to 1.04 times the thickness of the lens. The values of 2.03 and 1.04 may be selected for the lens in the following manner.

A lens material of a suitable refractive index is first chosen and the thickness $t_1$ and the value of the radius $R_4$ for the lens III are then selected. Under these conditions, the radius $R_3$ for the lens III may always be chosen so that the lens is free of spherical aberration. In general, lens III will be afflicted with coma. However, variation of the radius $R_4$ may then be made until the lens is substantially free of coma, it being noted that $R_3$ is always selected to eliminate spherical aberration. In carrying out these calculations, it is assumed that the object is located at a fixed distance from the surface of radius $R_3$ of the lens III. The particular value which is chosen for this distance $d_4$ in conjunction with the thickness $t_1$ of the lens III will determine the factor by which lens III increases the numerical aperture of the mirror system.

From the just noted calculations, it will now become apparent that the specification of $R_4$ as equal to 2.03 times the thickness of element III and $R_3$ as equal to 1.04 times the thickness of element III may be varied in order to provide a different factor of increase in the numerical aperture of the system or may be varied to shift the residual spherical aberration and coma. At the same time, it also becomes apparent that a family of lenses of the type of lens III will depend upon the refractive index of the lens material. Furthermore, additional families of menisci may be developed and numerical apertures greater than 1 may be obtained if an appropriate immersion liquid is employed between the concave surface of the meniscus lens and the object.

Such a lens as element III is not completely free of chromatic aberration but the two refractive surfaces thereof are mutually compensating for chromatic aberration to such a degree that the residual chromatic aberration is tolerable over a relatively large interval, i. e., over an interval of from 2 to 30 microns wavelength in the infrared. The absolute magnitude of the chromatic aberration in lens III is proportional to the scale to which the lens is constructed. Hence, it is desirable that the thickness of the lens be kept relatively small, for example, to the order of about 4.09.

Figure 5:
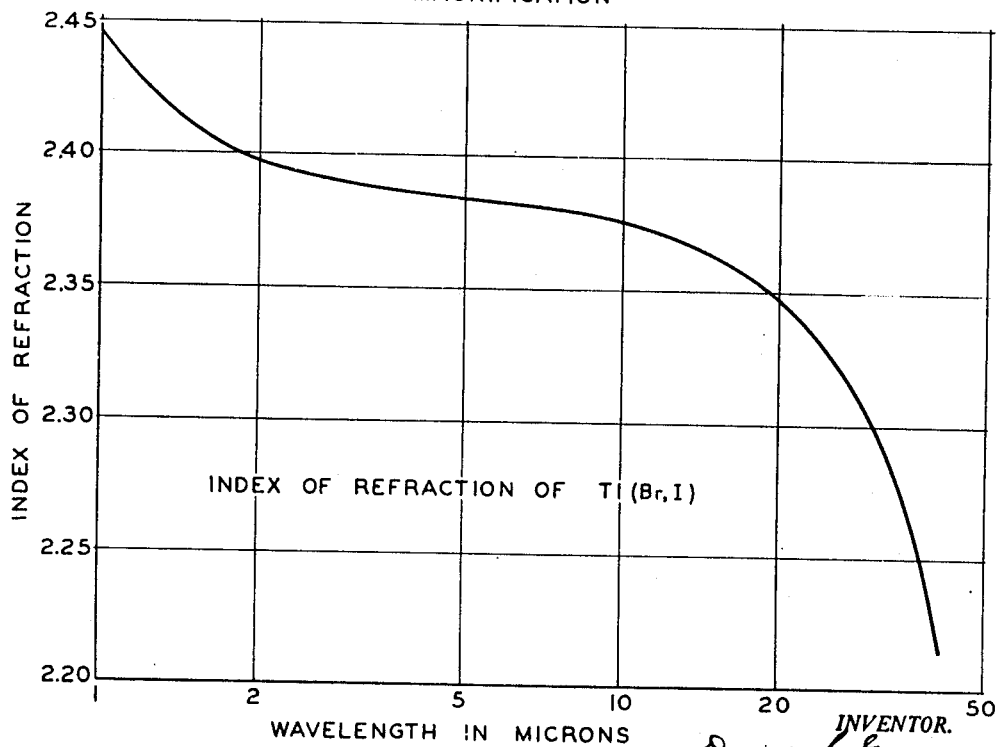
Fig. 5 is a graph showing the index of refraction of a preferred lens material within the infrared region of the spectrum.

A variety of suitable refractive materials may be employed for the element III of Fig. 2. A preferred material is thallium bromo-iodide which has the formula Tl(Br, I). This material, also known as KRS–5, is a mixed crystal of thallium bromide and thallium iodide. The refractive index for thallium bromo-iodide for different wavelengths in the infrared region of the spectrum is shown in detail in the graph which forms the subject of Fig. 5 where the logarithm of the refractive index of the material is plotted against wavelength in microns in the infrared.

Other infrared transmitting lens materials comprise potassium bromide and silver chloride. Some refractive indices of these materials within the more generally used portion of the infrared spectrum are set forth in the tables below.

TABLE 2

*Refraction index of potassium bromide in the infrared spectrum*

| Wavelength in Microns | Refractive Index |
| --- | --- |
| 2.357 | 1.5367 |
| 8.250 | 1.5290 |
| 12.9655 | 1.5177 |
| 15.910 | 1.5080 |
| 20.10 | 1.4867 |

TABLE 3

*Refraction index of silver chloride in the infrared spectrum*

| Wavelength in Microns | Refractive Index |
| --- | --- |
| 8.0 | 2.010 |
| 10.0 | 2.005 |
| 12.0 | 2.000 |

The embodiment of the invention illustrated in Fig. 2 makes use of curvatures and spacings for the lens element III and mirror elements IV and V of the order previously pointed out. The constructional data with dimensions in millimeters for the specific example of the lens system illustrated in Fig. 2 is given in the table which immediately follows.

TABLE 4

| Component | Radius | Distance | Material |
| --- | --- | --- | --- |
| Lens III | $R_3=4.25$ | $d_4=0.145$ | Tl(Br,I) |
| Mirror IV | $R_4=8.3$ | $t_1=4.09$ | |
| Mirror V | $R_5=7.60$ | $d_5=11.90$ | |
| | $R_6=29.00$ | $d_6=21.00$ | |
| | | $d_7=19.00$ | |

The objective disclosed in Fig. 2 is designed to have a numerical aperture of about 0.89, although smaller numerical apertures may obviously be used. This objective has a focal length of about 3.6 millimeters, a magnification of about $11x$, an obscuration of about 12% in area and is not corrected for cover slide.

As heretofore intimated, the specific design disclosed in connection with Fig. 2 may be varied by the reduction or enlargement, by equal percentages, of the radii and spacings of the design set forth.

Figure 3:
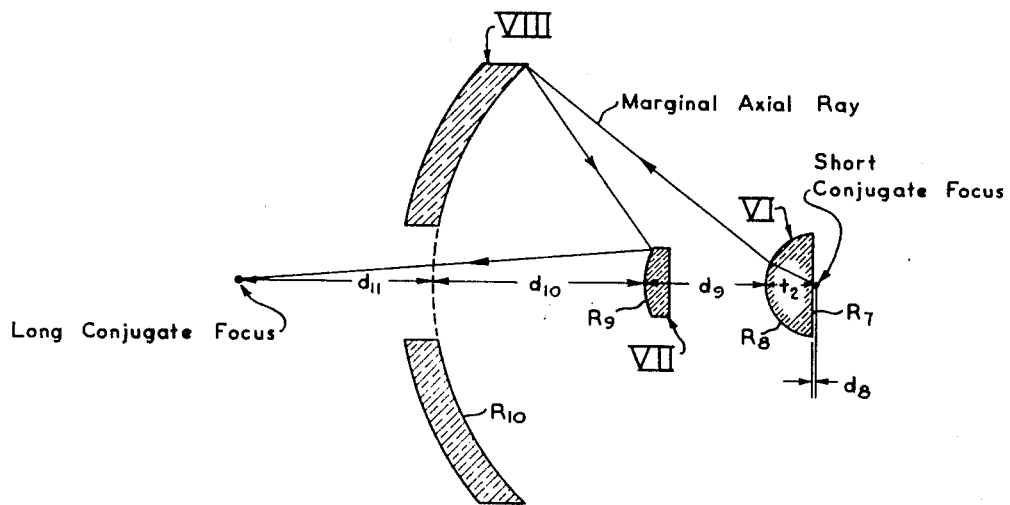
Fig. 3 is a view similar to Figs. 1 and 2 of still a further embodiment of the invention.

An immersion type objective is disclosed in Fig. 3. The objective of Fig. 3 also makes use of a refractive component and is capable of converting the mirror combination, specifically set forth in connection with Fig. 1, into an objective having an even larger numerical aperture than that of the objective of Fig. 2.

With reference to Fig. 3, an objective system is shown comprising mirrors VII and VIII which have radii $R_9$ and $R_{10}$, respectively equal to the radii $R_1$ and $R_2$ of the system shown in Fig. 1 and which are spaced apart by a distance $d_{10}$ substantially equal to the spacing $d_2$ between the mirrors I and II of Fig. 1. In addition, the objective of Fig. 3 employs a refractive lens element or component VI which is formed of infrared transmitting material. Lens element VI is in the form of a hemisphere with the plano surface thereof located at a distance $d_8$ from the short conjugate focus or object position of the system of Fig. 3. This hemisphere may be thought of as a limiting form of the meniscus lens previously described in connection with the objective of Fig. 2. The distance $d_8$ may, as illustrated in Fig. 3, be substantially equal to the distance $d_4$ of the system illustrated in Fig. 2.

In brief summary, the system of Fig. 3 is similar in all respects to the system of Fig. 2 with the exception that the plano-convex element VI replaces the meniscus lens III of Fig. 2. The thickness $t_2$ of the lens VI of Fig. 3 may be of any convenient magnitude. Due to the hemispherical nature of the lens VI, its thickness may be any convenient value.

The plano-convex lens element VI is so designed that the center of curvature of the convex surface thereof is located substantially at the plano surface of the lens. Also, the center of the curvature for the radius $R_8$ is adapted to be closely positioned to the object point, for example, by a spacing approximately equal to the spacing $d_4$ of Fig. 2. In use, this small distance $d_8$ is adapted to be filled with a liquid medium of a relatively high refractive index inasmuch as this particular objective is of the immersion type.

The discussion in regard to the increase in numerical aperture obtained by adding a refractive component to a mirror combination is equally applicable to the refracting-reflecting system of Fig. 3. In this instance, however, the numerical aperture of the system of Fig. 3 will equal the numerical aperture of the mirror combination times the refractive index of the lens material of the hemisphere VI since the objective under consideration is of the immersion type. Thus, the numerical aperture of the system of Fig. 3 will be equal to 0.63 times the refractive index of the element VI.

When the lens material for the element VI is silver chloride, the system of Fig. 3 will have a numerical aperture of about 1.26 at a wavelength in the infrared of about 10 microns. If a higher numerical aperture is desired, the element VI may be formed of thallium bromo-iodide, in which case the system will have a numerical aperture of about 1.49 at a wavelength in the infrared of 10 microns.

From the foregoing, it will appear that the immersion liquid employed with the immersion type objective of Fig. 3 should preferably possess an index which is greater than $0.63n$, where $n$ is the index of refraction of the hemispherical element VI. However, it should be noted that differences in the indices of refraction of an immersion liquid and a lens material with which the liquid is in contact are considerably less objectionable in infrared microscopy than in visible microscopy. This will be apparent when it is considered that infrared wavelengths are of a magnitude which is ten or more times greater than visible wavelengths so that the tolerance to aberrations, and particularly the tolerance on the refractive index of the immersion liquid, is correspondingly greater than that conventionally encountered in visible observation.

The embodiment of the invention illustrated in Fig. 3 makes use of curvatures and spacings for the lens element VI and mirror elements VII and VIII of the order previously pointed out. The constructional data with dimensions in millimeters for the specific example of the lens system illustrated in Fig. 3 is given in the table which immediately follows.

TABLE 5

| Component | Radius | Distance | Material |
|---|---|---|---|
| Lens VI | $R_7 = \infty$ | $d_8 = 0.145$ | Tl(Br,I) |
| Mirror VII | $R_8 = 5.0$ | $t_2 = 4.8$ | |
| Mirror VIII | $R_9 = 7.60$ | $d_9 = 11.90$ | |
| | $R_{10} = 29.00$ | $d_{10} = 21.00$ | |
| | | $d_{11} = 19.00$ | |

The objective disclosed in Fig. 3, and set forth in Table 5, employs a lens element VI of thallium bromo-iodide. This objective has a numerical aperture of about 1.49, a focal length of about 2.1 millimeters, a magnification of $18.5x$ and an obscuration of about 12% in area and is not corrected for cover slide.

It will be understood that as in the case of the designs disclosed in connection with Figs. 1 and 2, the objective of Fig. 3 may be varied by the reduction or enlargement, by equal percentages, of the radii and spacings specifically set forth.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. An objective of the character described for use within the infrared region of the spectrum and comprising two mirror elements constituted by a mirror element having a concave spherical reflecting surface and a mirror element having a convex spherical reflecting surface, said mirror elements being spaced apart axially with said concave reflecting surface facing the convex reflecting surface and also facing the short conjugate focus of the objective and with said concave mirror element having an opening extending centrally therethrough whereby said concave reflecting surface is annular in shape, said mirror elements providing a reflecting system which has a focal length of substantially 5.0 units of linear measure, said reflecting surfaces of said mirror elements being separated by a spacing equal to substantially 4.2 times said focal length, and said concave reflecting surface and said convex reflecting surface having radii of curvature respectively equal to substantially 5.8 times said focal length and substantially 1.52 times said focal length.

2. An objective for use in the infrared region of the spectrum and consisting as a whole of a reflecting system provided by a concave mirror element and a convex mirror element and a refracting system provided by one refracting lens element, the concave mirror element of said reflecting system having an opening extending therethrough and having a concave spherical reflecting surface whereby said concave reflecting surface is annular in shape, the convex mirror element of said reflecting system having a convex spherical reflecting surface located to face said concave reflecting surface and optically aligned therewith and said mirror elements providing said reflecting system with a short conjugate focus which lies on the side of said convex mirror element farthest from the concave mirror element, said refracting lens element being formed of an infrared transmitting material and having at least one convex refracting surface located in optical alignment with the reflecting system provided by said mirror elements on the side of said convex mirror element farthest from said concave mirror element, the reflecting system provided by said mirror elements having a focal length of substantially 5.0 units of linear measure, said reflecting surfaces of said mirror elements being separated by a space equal to substantially 4.2 times said focal length of said reflecting system and said concave reflecting surface and said convex reflecting surface having radii of curvature respectively equal to substantially 5.8 and substantially 1.52 times the focal length of said reflecting system, said lens element being spaced from said convex mirror element so as to form at a predetermined magnification and at a position substantially coinciding with the short conjugate focus of the reflecting system a magnified virtual image substantially free of spherical aberration and coma whereby the object plane for said lens element is the object plane for the objective as a whole.

3. An objective of the character defined in claim 2 wherein said refractive lens element is a meniscus lens.

4. An objective of the character set forth in claim 2 wherein said refractive lens element has a concave refracting surface and a convex refracting surface with said convex refracting surface located the closer to said convex mirror element.

5. An objective of the character set forth in claim 2 wherein said refractive lens element is a plano-convex component with the plane surface thereof furthest removed from said convex mirror element.

6. An objective of the character defined in claim 2 wherein said refractive lens element is a plano-convex component adapted to form a virtual image of said object at the short conjugate focus of said mirror system, said lens element being positioned to have its plane surface relatively close to but spaced from the short conjugate focus of the objective as a whole and having the center of curvature of the convex surface thereof located substantially at the plano surface of said lens.

7. An objective of the character set forth in claim 2 wherein said refracting element has a thickness of approximately .82 times the focal length of said reflecting system, a concave refracting surface adjacent the short conjugate focus of said objective which possesses a radius equal to substantially .85 times said focal length of said reflecting system and a convex refracting surface removed from said short conjugate focus which possesses a radius equal to substantially 1.66 times said focal length of said reflecting system and wherein the lens material for said refracting lens element is thallium bromo-iodide.

References Cited in the file of this patent

UNITED STATES PATENTS

| Number | Name | Date |
|---|---|---|
| 1,967,214 | Acht | July 24, 1934 |
| 2,097,494 | Lihotzky | Nov. 2, 1937 |
| 2,198,014 | Ott | Apr. 23, 1940 |
| 2,380,887 | Warmisham | July 31, 1945 |
| 2,380,888 | Warmisham | July 31, 1945 |
| 2,490,052 | Harris | Dec. 6, 1945 |
| 2,520,634 | Grey | Aug. 29, 1950 |

FOREIGN PATENTS

| Number | Country | Date |
|---|---|---|
| 3,058 | Great Britain | of 1903 |
| 538,622 | Great Britain | Aug. 11, 1941 |
| 61,355 | Denmark | Sept. 27, 1943 |